(12) United States Patent
Foersch

(10) Patent No.: US 8,333,400 B2
(45) Date of Patent: Dec. 18, 2012

(54) OFF SET HITCH

(76) Inventor: Louis Foersch, West Dihston, PA (US)

( * ) Notice: Subject to any disclaimer, the term of this patent is extended or adjusted under 35 U.S.C. 154(b) by 169 days.

(21) Appl. No.: 12/577,524

(22) Filed: Oct. 12, 2009

(65) Prior Publication Data
US 2011/0084465 A1  Apr. 14, 2011

(51) Int. Cl.
*B60D 1/44* (2006.01)
(52) U.S. Cl. ........................................ 280/472; 280/467
(58) Field of Classification Search ............... 280/456.1, 280/467, 447, 472, 491.2, 415.1, 416.1, 204
See application file for complete search history.

(56) References Cited

U.S. PATENT DOCUMENTS

| | | | | |
|---|---|---|---|---|
| 2,976,059 | A * | 3/1961 | Van Der Lely et al. | 172/677 |
| 3,945,668 | A * | 3/1976 | Holland | 280/423.1 |
| 5,387,001 | A * | 2/1995 | Hull et al. | 280/402 |
| 6,142,103 | A * | 11/2000 | Meyers et al. | 119/771 |
| 6,612,615 | B1 * | 9/2003 | Dimand | 280/769 |
| 2005/0051995 | A1 * | 3/2005 | Abel | 280/491.1 |

* cited by examiner

*Primary Examiner* — Tony H. Winner
(74) *Attorney, Agent, or Firm* — Michael Ries

(57) ABSTRACT

A towing apparatus connected to a towing vehicle for connecting farm machinery having an off center hitch to be aligned with the towing vehicle having a first member connected to the towing vehicle and a second member connected to the first member and to the hitch on the farm machinery being towed. The first and second members position the farm machinery to be in alignment with the towing vehicle by compensating for the position of the off set hitch on the farm machinery relative to the center of the towing vehicle.

15 Claims, 1 Drawing Sheet

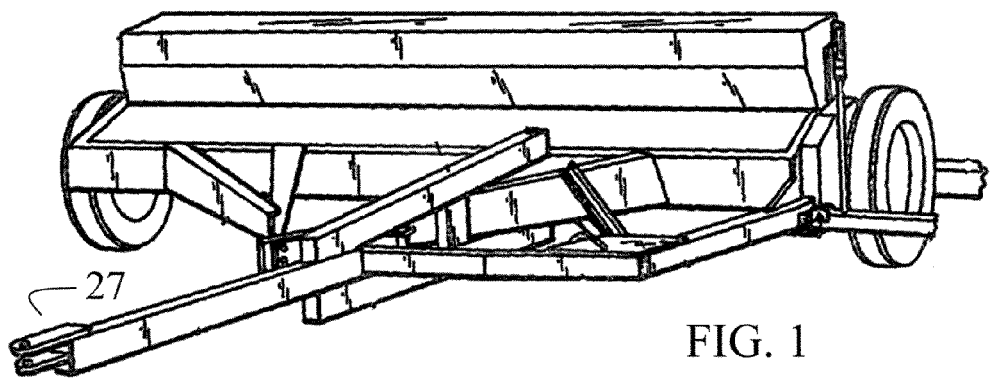
FIG. 1
FIG. 2
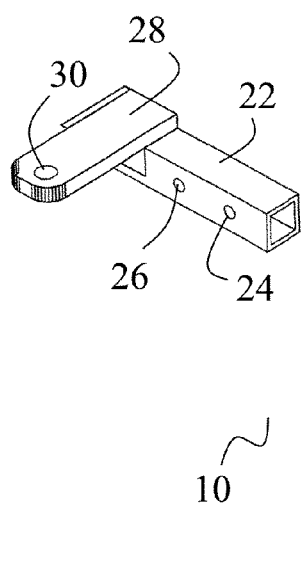
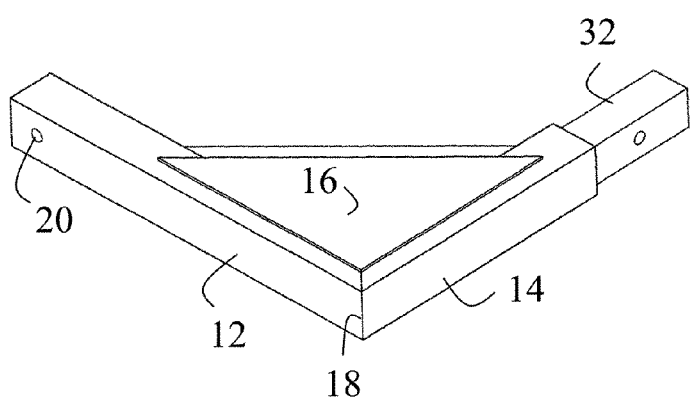

OFF SET HITCH

BACKGROUND OF THE INVENTION

1. Field of the Invention

This invention relates generally to towing apparatus for utility vehicles and more specifically to an off center hitch, which can align an oversize towed farm machine with a utility vehicle.

2. Description of Related Art

When using farm machinery to work a farm, it is advantageous to tow a number of farm machines such as haybines, finishing mowers, balers and rakes in an offset relationship to each other behind a tractor rather than towing the various machines in alignment one behind the other. This offset relationship allows the farmer to cover more area in a single pass which clearly results in a saving of time and fuel. However, there is a need to transport the farm machines over public roads to other farms for use. Because the hitches on the farm machines are off set to allow the machines to be towed in an offset relationship to cover more ground when being used, the conventional method of towing a farm machine with an off set hitch over public roads when going to a new location results in the towed farm machine taking up a major part of a second lane. This can be a major traffic safety hazard, particularly on a winding two lane highway.

One problem is that the towing vehicle can experience difficulty in maintaining control when traveling on a two lane road that has many turns, dips and rises. Another problem is that the offset relationship of the towed machine relative to the towing vehicle can prevent the towing vehicle from maintaining a straight path without compensating for the off center pull that is applied to the rear of the towing vehicle.

Various hitches have been proposed in an attempt to allow the towing vehicle to travel along winding two lane highways while towing a relatively wide farm machine with a hitch that is offset. However, these hitches have not been fully successful in solving the various problems that are associated with towing relatively wide farm machines that have a hitch that is not centered.

What is disclosed is an off set hitch which quickly and easily allows a person to align towed equipment, such as a farm machine with an off set hitch with the towing vehicle without changing or modifying the off set hitch on the farm machine being towed. Alignment of a farm machine having an off set hitch with a towing vehicle is obtained by providing the towing vehicle with a hitch that is offset in the opposite direction.

SUMMARY OF THE INVENTION

In an exemplary embodiment of the present invention, there is disclosed an apparatus connected to a towing vehicle for connecting farm machinery having an off center hitch to be in alignment with the towing vehicle where the apparatus has a first member connected to the towing vehicle and a second member connected to the first member and to the hitch on the farm machinery being towed. The first and second members position the farm machinery to be in alignment with the towing vehicle by compensating for the position of the off set hitch on the farm machinery.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

FIG. 1 is a partial perspective view of a farm machine that includes a hitch for connection to a single towing vehicle such as a tractor where the hitch is shown in an offset configuration for field use; and FIG. 2 is an exploded perspective view of an off set hitch in accordance with the principles of the invention.

DETAILED DESCRIPTION

Referring to FIG. 1, there is shown a partial perspective view of a farm machine that includes a hitch 27 for connection to a towing vehicle such as a tractor where the hitch is shown in an offset configuration for field use. The farm machine shown in FIG. 1 is shown with its hitch in an off set position for field use where it will be towed behind a tractor. The farm machine includes a conventional main body, a pair of spaced apart wheels and a forwardly protruding hitch member having a female hitch to which a standard stub tongue member at the rear of a tractor may be attached for pulling the farm equipment.

Referring to FIG. 2, there is shown an exploded perspective view of the off set hitch 10 which, when used to couple a farm machine that has an off set hitch to the rear of a tow vehicle, will align the farm machine with the tow vehicle. Off set hitch 10 has a first member 12 attached to a second member 14 where the members are oriented to be 90 degrees to each other. To provide structural support, a corner plate 16 is attached to members 12 and 14.

Members 12 and 14 are welded together to form a corner 18, and a corner plate 16 is welded to the top of the two members 12 and 14. To provide additional support and stiffness to the two right angle members 12, 14, a second corner plate is welded to the bottom surface of the two right angle members 12, 14.

Member 12 has a length of about six feet and member 14 has a length of about 16 inches. Each member is composed of steel or iron and is a square tube that is two and one-quarter inches on each side and one quarter of an inch thick. The corner plates are one eighth of an inch thick and have a length of about twelve inches along each side edge. A five eighth of an inch diameter opening is drilled or punched into member 12 approximately one and one half of an inch from the end. Opening 20 is provided to accept a pin, not shown, that is used to attach a slider 22 to member 12.

Slider 22 has a length of about ten inches and is composed of a square tube which is about two inches on each side and about one quarter of an inch in thickness. Slider 22 has two openings 24, 26 of about five eighths of an inch in diameter. A stub tongue hitch member 28 is welded to the end of slider 22 and includes opening 30 for receiving a coupling pin when coupled to the hitch 27 (see FIG. 1) on the farm machine. Slider 22 slides into member 12 as shown or is rotated 180 degrees to position stub tongue hitch member to the left or right and locked in position by inserting a coupling pin through opening 20 in member 12 and aligned opening 24 or 26 in slider 22.

Member 14 slides onto square tube 32 that is about two inches on each side where tube 32 has a circular opening of about five eighths of an inch in diameter which is sized to receive a coupling pin.

With the new off center hitch here disclosed, a farm machine with an off center hitch can be attached to a tow vehicle which will automatically position the farm machine being towed to be aligned with the towing vehicle. Clearly, as the width of farm equipment is relatively wide, the aligned single file position of the farm machine with the tow vehicle is necessary for safe travel over roads, particularly over two lane roads and through farm buildings or gates that are of normal width.

Due to the hitch design of agricultural machines, conventional hitches used for towing oversized farm machinery with off center hitches require more than a single lane, and often up to two lanes of a road, which is a traffic safety hazard. The off set hitch here disclosed is a coupling apparatus that compensates for the off set hitch on farm machinery by positioning the farm machinery being towed to be aligned with the vehicle that is doing the towing.

While there have been shown and described and pointed out the fundamental novel features of the invention as applied to the preferred embodiments, it will be understood that various omissions and substitutions and changes of the form and details of the apparatus illustrated and in the operation may be done by those skilled in the art, without departing from the spirit of the invention.

What is claimed is:

1. An apparatus connected to a towing vehicle to connect a farm machinery having an elongated off center hitch with a single centered aperture to be aligned with the towing vehicle, comprising:
   a first member connected to the farm machinery via a slider; and
   a second member connected to said towing vehicle;
   wherein said first and second members compensate for a position of the offset hitch on the farm machinery in relation to a position of the farm machinery in alignment with the towing vehicle.

2. The apparatus of claim 1 further comprising a male hitch member connected to the second member to couple the second member to the off center hitch on the farm machinery.

3. The apparatus of claim 2 wherein an end of said first member is connected at a right angle to an end of said second member.

4. The apparatus of claim 3 wherein said male hitch member is connected to a third member that is coupled to the second member.

5. The apparatus of claim 4 wherein said third member is slidably connected to said second member.

6. The apparatus of claim 5 wherein said third member is locked to said second member within a pin that slides into aligned openings in said second and third members.

7. The apparatus of claim 6 wherein said first member is slidably connected to a member on said towing vehicle.

8. The apparatus of claim 7 wherein a horizontal corner plate is attached to the first and second members to provide structural support to said members.

9. The apparatus of claim 8 wherein said corner plate is attached to the top surface of the first and second members.

10. The apparatus of claim 9 wherein said corner plate is welded to said first and second members.

11. The apparatus of claim 10 wherein said corner plate is welded to said first and second members at the right corner.

12. The apparatus of claim 11 wherein said corner plate is welded to the top surface of said first and second members.

13. The apparatus of claim 12 wherein a second horizontal corner plate is attached to the bottom surface of the first and second members.

14. The apparatus of claim 13 said second corner plate is welded to the bottom surface of said first and second members.

15. The apparatus of claim 1 wherein said single centered aperture slidably receives a pin to secure said towing vehicle.

* * * * *